(12) United States Patent
Mori (10) Patent No.: US 7,103,395 B2
(45) Date of Patent: Sep. 5, 2006

(54) FOLDING MOBILE TERMINAL DEVICE CAPABLE OF RECEIVING AND TRANSMITTING SOUND WHILE FOLDED

(75) Inventor: Ukyo Mori, Tokyo (JP)

(73) Assignee: NEC Corporation, Tokyo (JP)

( * ) Notice: Subject to any disclaimer, the term of this patent is extended or adjusted under 35 U.S.C. 154(b) by 549 days.

(21) Appl. No.: 10/254,651

(22) Filed: Sep. 26, 2002

(65) Prior Publication Data
US 2004/0203491 A1    Oct. 14, 2004

(30) Foreign Application Priority Data
Oct. 11, 2001 (JP) .............................. 2001-313795

(51) Int. Cl.
*H04M 1/00* (2006.01)
(52) U.S. Cl. ............... 455/575.1; 455/556.1; 455/569.1; 455/575.3; 455/90.3
(58) Field of Classification Search ............ 455/569.1, 455/556.1, 575.1, 575.3, 90.3
See application file for complete search history.

(56) References Cited

U.S. PATENT DOCUMENTS

| 5,884,156 | A | * | 3/1999 | Gordon | 455/321 |
| 5,890,072 | A | * | 3/1999 | Rabe | 455/550.1 |
| 6,259,932 | B1 | * | 7/2001 | Constien | 455/556.1 |
| 6,571,086 | B1 | * | 5/2003 | Uusimaki | 379/368 |
| 6,678,504 | B1 | * | 1/2004 | Toki | 455/575.3 |
| 6,748,243 | B1 | * | 6/2004 | Kubo et al. | 455/569.1 |

FOREIGN PATENT DOCUMENTS

| EP | 0 897 236 A2 | 2/1999 |
| GB | 2 295 744 A | 6/1996 |
| GB | 2 337 899 A | 12/1999 |
| GB | 2 358 984 A | 8/2001 |
| JP | 7-500230 A | 1/1995 |
| JP | 9-93318 A | 4/1997 |
| JP | 9-135286 A | 5/1997 |
| JP | 11-68899 A | 3/1999 |
| JP | 11-187098 A | 7/1999 |
| JP | 2000-307700 A | 11/2000 |
| JP | 2001-211241 A | 8/2001 |
| WO | WO 98/27704 A1 | 6/1998 |

* cited by examiner

*Primary Examiner*—Matthew Anderson
*Assistant Examiner*—Sanh Phu
(74) *Attorney, Agent, or Firm*—Sughrue Mion, PLLC (57) ABSTRACT

When an incoming call is received, a control unit confirms using an open/close sensor whether or not a mobile terminal device is in the close state. When the mobile terminal device is folded, the control unit establishes a communications state, changes the amplification rate of a first amplifier such that the reception signal can be output at the sound level predetermined as the level to be output from the receiver, changes the signal path so that the received voice can be output from the speaker by operating a switch, and changes the transmitted voice sensitivity by adjusting the amplification rate of a second amplifier so that the microphone can collect sound although it is separate from the mouse of the user, thereby realizing the conversation with the mobile terminal device folded.

19 Claims, 8 Drawing Sheets

FIG. 8

FOLDING MOBILE TERMINAL DEVICE CAPABLE OF RECEIVING AND TRANSMITTING SOUND WHILE FOLDED

BACKGROUND OF THE INVENTION

1. Field of the Invention

The present invention relates to a folding mobile terminal device, and more particularly to a device, such as a mobile telephone, that capable of receiving and transmitting voice sounds without being opened.

2. Description of the Related Art

Recently, the usage of mobile terminal devices such as mobile telephones have become widespread. The mobile terminal devices can be of various types. Typically, a folding mobile terminal device comprises a first case unit and a second case unit, with the first case unit and the second case unit connected to be opened/closed by a hinge system has become the most prevalent.

When the folding mobile terminal device receives a call, the user cannot hear the received voice sounds unless the mobile terminal device enters the open state in which the mobile terminal device is unfolded 180° from the folded state. Therefore, with the device, the time period from the reception to the recognition of the received voice sounds is delayed for a moment.

To solve the above-mentioned problem, various suggestions have been made. For example, in Japanese Laid-Open Patent Application Heisei 11-68899, a folding mobile wireless communications device comprises a first housing having a first reception unit, a second housing having a first transmission unit and a first key operation unit, and a hinge unit for coupling the first housing and the second housing. The second reception unit, the second transmission unit, and a response key in response to an incoming call are disposed on the back of the first housing or the second housing, and the mobile wireless communications device in a folded state can establish communications. Moreover, a non-directional low-profile microphone is disposed in a flip folding cover over the front of the mobile telephone, along with a sound hole for incoming sound wave in the front and back of the flip where the microphone is located.

In Japanese Laid-Open Patent Application Heisei 11-187098, a folding mobile wireless communication equipment is disposed with a first housing and a second housing, with the first housing connected to the second housing using a hinge unit, and with the first housing and second housing moving on the hinge unit to fold on the surfaces of the first and second housings of the wireless communication equipment. On the exposed surface of the folded communication equipment, a first reception unit, a first transmission unit, an off-hook operation unit and an on-hook operation unit are provided.

That is, the above mentioned mobile communication equipment has the feature of establishing communications without opening the housings when an incoming call is to be received.

However, in any mobile communication equipment, the device of a built-in communications system is insufficient. Therefore, it may be hard to clearly hear received voice.

SUMMARY OF THE INVENTION

An aspect of the present invention is to provide a mobile communication equipment capable of establishing communications without opening the housings when an incoming call is to be received, improving the low audibility, and reducing the cost.

To solve the above mentioned problem, a folding mobile terminal device comprises a first case unit, a second case unit, and a hinge that connects the first case unit and the second case unit. The mobile terminal device further comprises a first mouthpiece disposed on an open/close surface of the first case unit, a second mouthpiece disposed on a surface adjacent to the open/close surface, a first earpiece disposed on an open/close surface of the second case unit and a second earpiece disposed on a surface other than the open/close surface. The mobile terminal device of the present invention further comprises a microphone that is used for both the first mouthpiece and second mouthpiece and a microphone holder that holds the microphone. The microphone holder has a hole so that transmitted voice can be inputted into the second mouthpiece. The microphone holder may be either cylindrical or rectangular parallelepiped. The first mouthpiece and the second mouthpiece may be also either circular or rectangular. The mobile terminal device of the present invention further comprises a detection means for detecting an open/close state of the first case unit and the second case unit. The second mouthpiece is disposed on at least one of a lower side, a right side and a left side of the first case unit. The second earpiece is disposed on at least one of a reverse side of the open/close surface, an upper side, a right side and a left side adjacent to the open/close surface of the second case unit. The mobile terminal device of the present invention further comprises an outputting means for outputting received voice sounds through the second earpiece when the first case unit and the second case unit are in a closed state, and outputting received voice sounds through the first earpiece when the first case unit and the second case unit are in an open state. The mobile terminal device of the present invention further comprises an inputting means for inputting transmitted voice sounds through the second mouthpiece when the first case unit and the second case unit are in a closed state, and transmitted voice sounds through at least one of the first mouthpiece and second mouthpiece when the first case unit and the second case unit are in an open state. The mobile terminal device of the present invention may further comprise a controlling means for controlling at least one of transmitted voice sensitivity and received voice sensitivity on the basis of a result of the the detection means. The mobile terminal device is preferably a portable telephone.

Further, a incoming call notifying method for a folding mobile terminal device according to the present invention comprises receiving an incoming call, detecting whether or not the mobile terminal device is folded, changing received voice sensitivity of a first earpiece and transmitted voice sensitivity of a first mouthpiece using a microphone if the mobile terminal device is folded. The incoming call method further comprises changing received voice sensitivity of a second earpiece and transmitted voice sensitivity of a second mouthpiece using the microphone if the mobile terminal device is opened. The incoming call notifying method for a folding mobile terminal device further comprises judging whether or not a predetermined switch has been operated, and changing transmitted voice sensitivity of the first mouthpiece using the microphone when the switch is operated and the mobile terminal device is folded. After the sensitivity has been determined, recording of the user's voice is done via the first mouthpiece. The mobile terminal device may be a portable telephone.

In accordance with the present invention, a conversation (communication) can be performed without an opening operation when an incoming call is to be received, and the problem that a speech cannot be recognized can be solved, and the costs of manufacture can be reduced.

Then, the voice recording process is started when the button is pressed with the mobile terminal device folded in a wait state, and the speaker's voice can be collected by a microphone through the second mouthpiece, and then stored in the memory.

BRIEF DESCRIPTION OF THE DRAWINGS

These and other aspects, features and advantages of the invention will become more fully apparent from the following detailed description taken in conjunction with accompanying drawings. In the drawings.

DETAILED DESCRIPTION OF THE EMBODIMENTS

Hereinafter, each embodiment of the present invention will be described in detail with reference to the drawings.

Figure 1A:
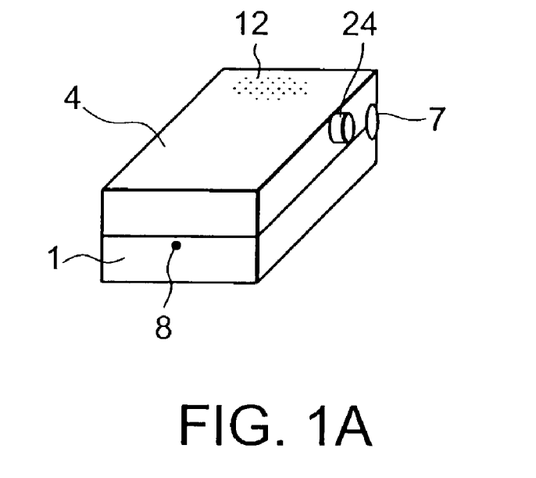
FIG. 1A is an oblique view of an embodiment of the mobile terminal device in a close state.
Figure 1B:
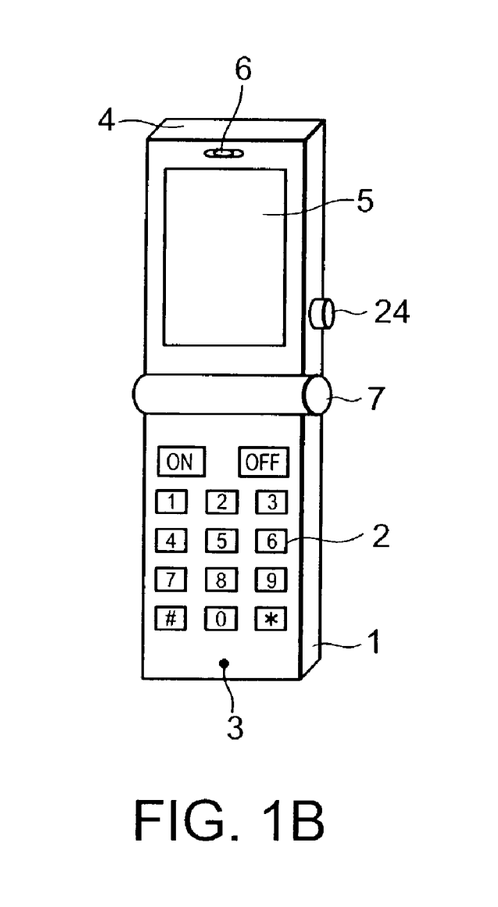
FIG. 1B is an oblique view of the embodiment of the mobile terminal device in an open state.

FIG. 1A is an oblique view of the mobile terminal device in the close state. FIG. 1B is an oblique view of the mobile terminal device in the open state.

FIGS. 1A and 1B show a lower case 1, buttons 2 such as a keyboard disposed in a predetermined position of the open/close surface, and a microphone voice inlet 3 disposed in a central position between the left and right ends of the bottom of the open/close surface of the lower case 1. A microphone voice inlet 8 is disposed in the central position between the left and right ends on the lower side of the lower case 1.

They also show an upper case 4, a liquid crystal display unit 5 disposed on the open/close surface of the upper case 4, a receiver 6 disposed in the central position between the left and right ends of the top of the open/close surface of the upper case 4. A button 24 is disposed on the side of the upper case 4 and is used for executing various functions. A speaker 12 is disposed on the reverse side of the open/close surface of the upper case 4.

The lower case 1 and the upper case 4 are connected by a hinge system 7, thereby allowing a 180° angle between the lower case 1 and the upper case 4 to be set in the open state as shown in FIG. 1B, and can be set in the close state as shown in FIG. 1A by turning the upper case 4 toward the lower case 1.

Figure 2A:
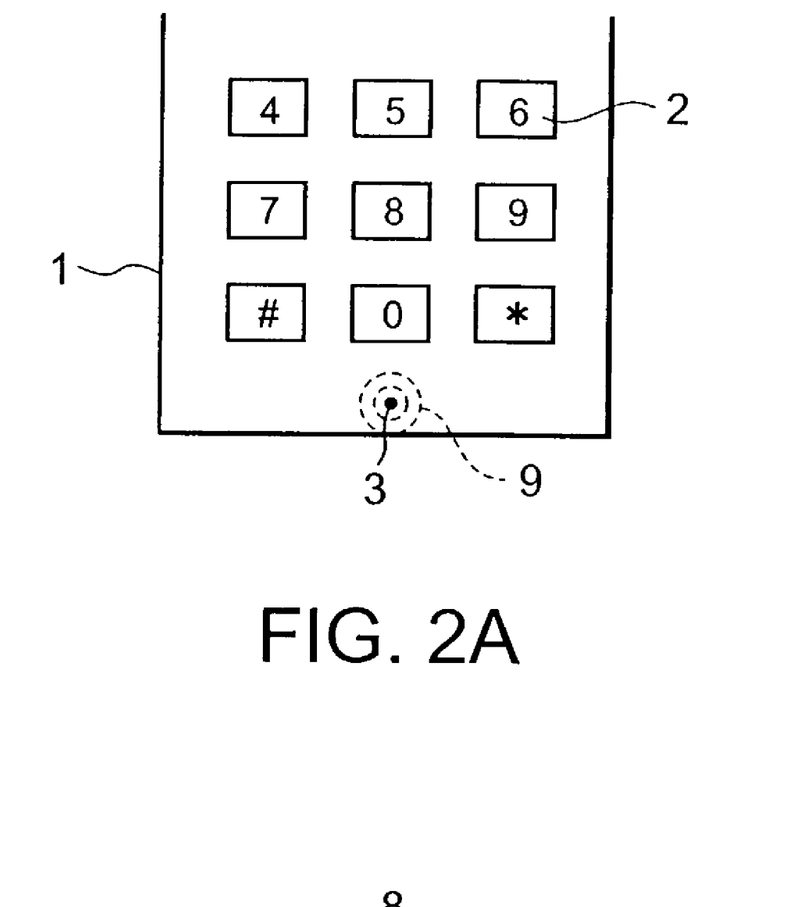
FIG. 2A is a partial plan view for explanation of placing a microphone holder according to an embodiment of the present invention.
Figure 2B:
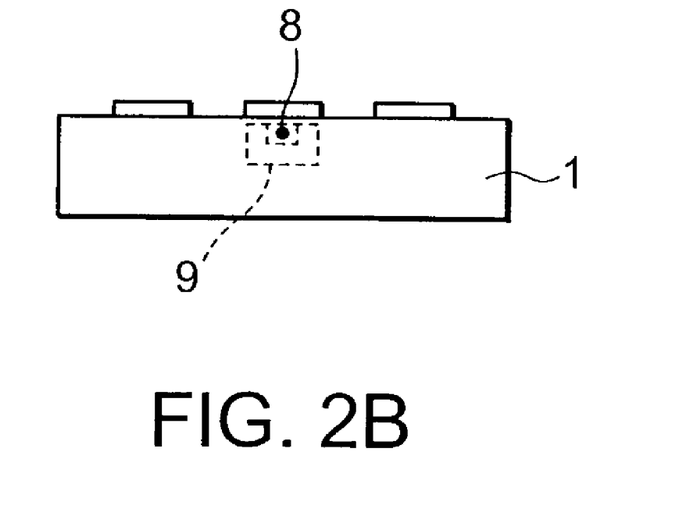
FIG. 2B is a partial front view for explanation of placing a microphone holder according to an embodiment of the present invention.

FIG. 2A is a partial plan view for explanation of the placement of the microphone holder. FIG. 2B is a partial front view for explanation of the placement of the microphone holder 9. As shown in FIGS. 2A and 2B, in the present invention, the microphone holder 9 is used for not only the microphone voice inlet 3 but also the microphone voice inlet 8.

Figure 3A:
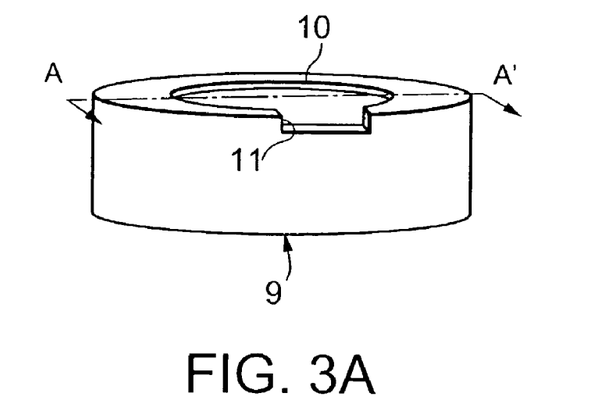
FIG. 3A is an oblique view of the microphone holder according to an embodiment of the present invention.
Figure 3B:
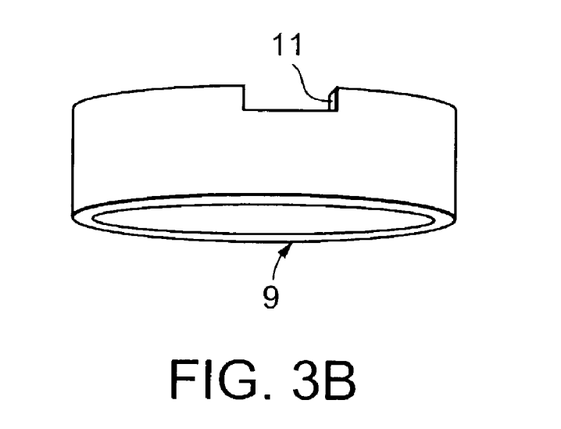
FIG. 3B is an oblique view of the microphone holder according to an embodiment of the present invention.
Figure 3C:
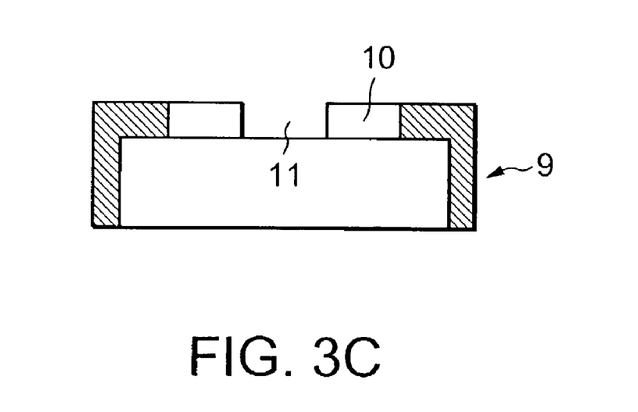
FIG. 3C is a sectional view of the microphone holder according to an embodiment of the present invention.

FIGS. 3A and 3B are oblique views of the microphone holder 9 for use in the present invention. FIG. 3C is a sectional view of the microphone holder 9 along the line A–A' shown in FIG. 3A.

The cylindrical microphone holder 9 has a hole 10 corresponding to the microphone voice inlet 3 disposed in the open/close surface of the lower case 1, and has a hole 11 corresponding to a microphone voice inlet 8 disposed in the lower side of the lower case 1. When the microphone holder 9 is built in the predetermined position of the lower case 1, the microphone voice inlet 3 faces the hole 10, and the microphone voice inlet 8 faces the hole 11.

The microphone is inserted from the bottom of the microphone holder 9 with the surface, on which the vibration plate of the microphone is disposed, facing upward, and the microphone is held by friction between the microphone and the inner side of the microphone holder 9.

Therefore, the incoming voice sounds through the microphone voice inlet 3 and the hole 10 are converted into an electrical signal by the microphone built in the microphone holder 9. The incoming voice sounds through the microphone voice inlet 8 and the hole 11 are converted into an electrical signal by the microphone built in the microphone holder 9. That is, if the mobile terminal device is in the close state shown in FIG. 1A, the voice sounds are converted into an electrical signal through the path of the microphone voice inlet 8→the hole 11→the microphone. If the mobile terminal device is in the open state as shown in FIG. 1B, the voice sounds are converted into an electrical signal through the path of the microphone voice inlet 3→the hole 10→the microphone.

Therefore, when the mobile terminal device is in the closed state shown in FIG. 1A, the received voice sounds are regenerated by the speaker 12. When the mobile terminal device is in the open state shown in FIG. 1B, the received voice sounds are regenerated by the receiver 6.

That is, in the state shown in FIG. 1A, the conversation is established by the microphone voice inlet 8 and the speaker 12. In the state shown in FIG. 1B, the conversation is established by the microphone voice inlet 3 and the receiver 6. That is, the conversation can be established in either open or close state of the mobile terminal device.

Figure 4:
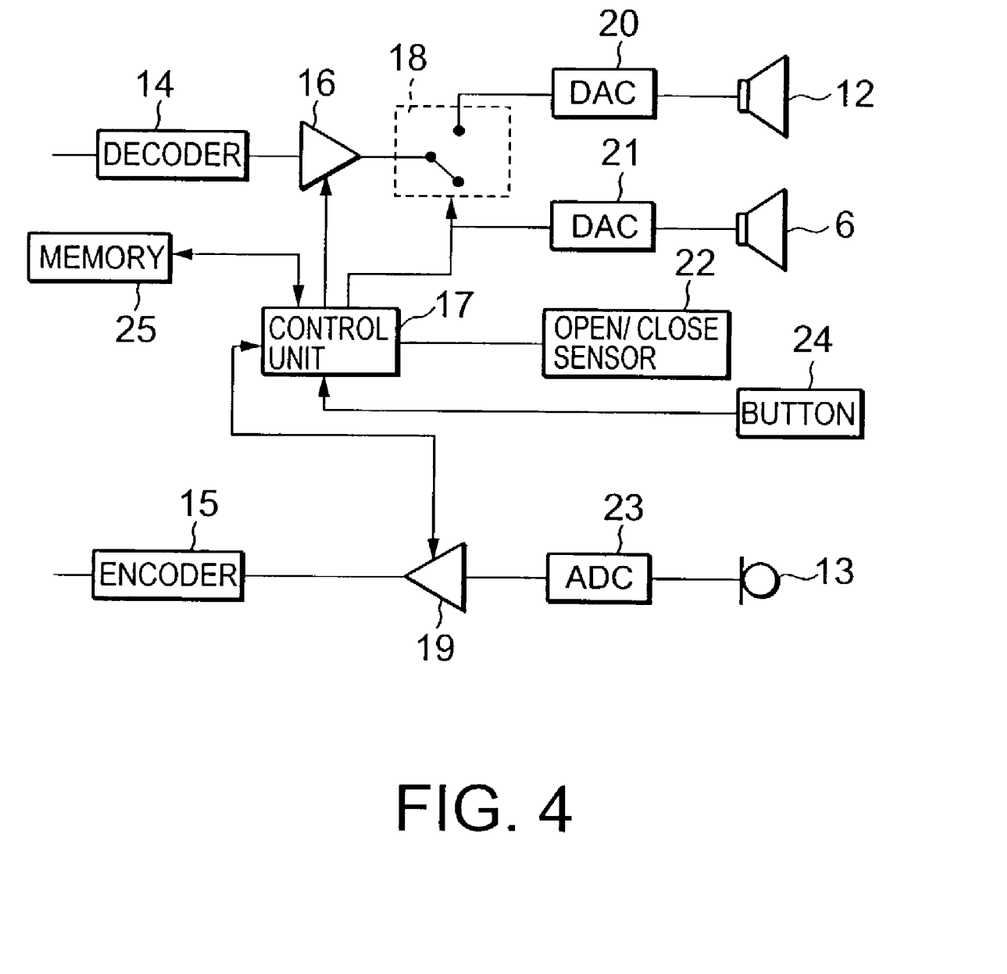
FIG. 4 is a block diagram of the circuit configuration of the mobile terminal device according to an embodiment of the present invention.

FIG. 4 is a block diagram of the configuration of the circuit of the mobile terminal device.

As shown in FIG. 4, the mobile terminal device according to the present invention comprises a decoder 14, an encoder 15, a first amplifier 16, a control unit 17, a switch 18, a second amplifier 19, a first D/A converter 20, a second D/A converter 21, an open/close sensor 22, an A/D converter 23, a button 24 disposed on the side of the upper case 4, memory 25, a modulator (not shown in FIG. 4), a demodulator (not shown in FIG. 4), a wireless unit (not shown in FIG. 4), and an antenna (not shown in FIG. 4) in addition to the receiver 6, the speaker 12, and a microphone 13.

The decoder 14 is connected to the demodulator (not shown in FIG. 4) and the first amplifier 16, and decodes a signal which is received by the antenna, passes through the wireless unit, and is demodulated by the demodulator, and transmits it to the first amplifier 16.

The first amplifier 16 is connected to the decoder 14, the control unit 17, and the switch 18, amplifies a digital signal received from the decoder 14 at an amplification rate set by the control unit 17, and transmits the signal to the switch 18.

The switch 18 is connected to the first amplifier 16, the control unit 17, the first D/A converter 20, and the second D/A converter 21, and transmits the digital signal received from the first amplifier 16 to one of the first D/A converter 20 and the second D/A converter 21 at an instruction of the control unit 17.

The first D/A converter 20 is connected to the switch 18 and the speaker 12, converts the digital signal received from the switch 18 into an analog signal, and transmits it to the speaker 12. The second D/A converter 21 is connected to the switch 18 and the receiver 6, converts the digital signal received from the switch 18 into an analog signal, and transmits it to the receiver 6.

The A/D converter 23 is connected to the second amplifier 19 and the microphone 13, converts the analog signal (voice signal) collected by the microphone 13 into a digital signal, and transmits it to the second amplifier 19.

The second amplifier 19 is connected to the encoder 15, the control unit 17, and the A/D converter 23, amplifies the digital signal received from the A/D converter 23 at an amplification rate set by the control unit 17, and transmits it to the encoder 15.

The encoder 15 is connected to the second amplifier 19 and a modulator (not shown in FIG. 4), coding the digital signal received from the A/D converter 23, and transmits it to modulator (not shown in FIG. 4). The signal transmitted to the modulator is modulated, passes through a wireless unit (not shown in FIG. 4), and transmitted from an antenna (not shown in FIG. 4).

The control unit 17 is connected to the first amplifier 16, the switch 18, the second amplifier 19, the open/close sensor 22, the memory 25, and the button 24. The control unit 17 receives the signal from the open/close sensor 22 and the button 24, controls the amplification rate of the first amplifier 16, controls the switch 18, and controls the amplification rate of the second amplifier 19. The control unit 17 also processes an incoming call to a mobile terminal, and stores the output signal of the second amplifier 19 in the memory 25.

The open/close sensor 22 is connected to the control unit 17, and notifies the control unit 17 using an electrical signal of the mobile terminal device in the open state when the mobile terminal device is completely in the open state (as shown in FIG. 1B). When the mobile terminal device is in the completely open state, the open/close sensor 22 notifies the control unit 17 of the open state of the mobile terminal because a received voice output signal can be passed to the voice transmission side. Since howling can occur if the amplification rate of the first amplifier 16 is changed, a signal path is changed by the switch 18, and the amplification rate of the second amplifier 19 is changed when the device is not completely opened.

Figure 5:
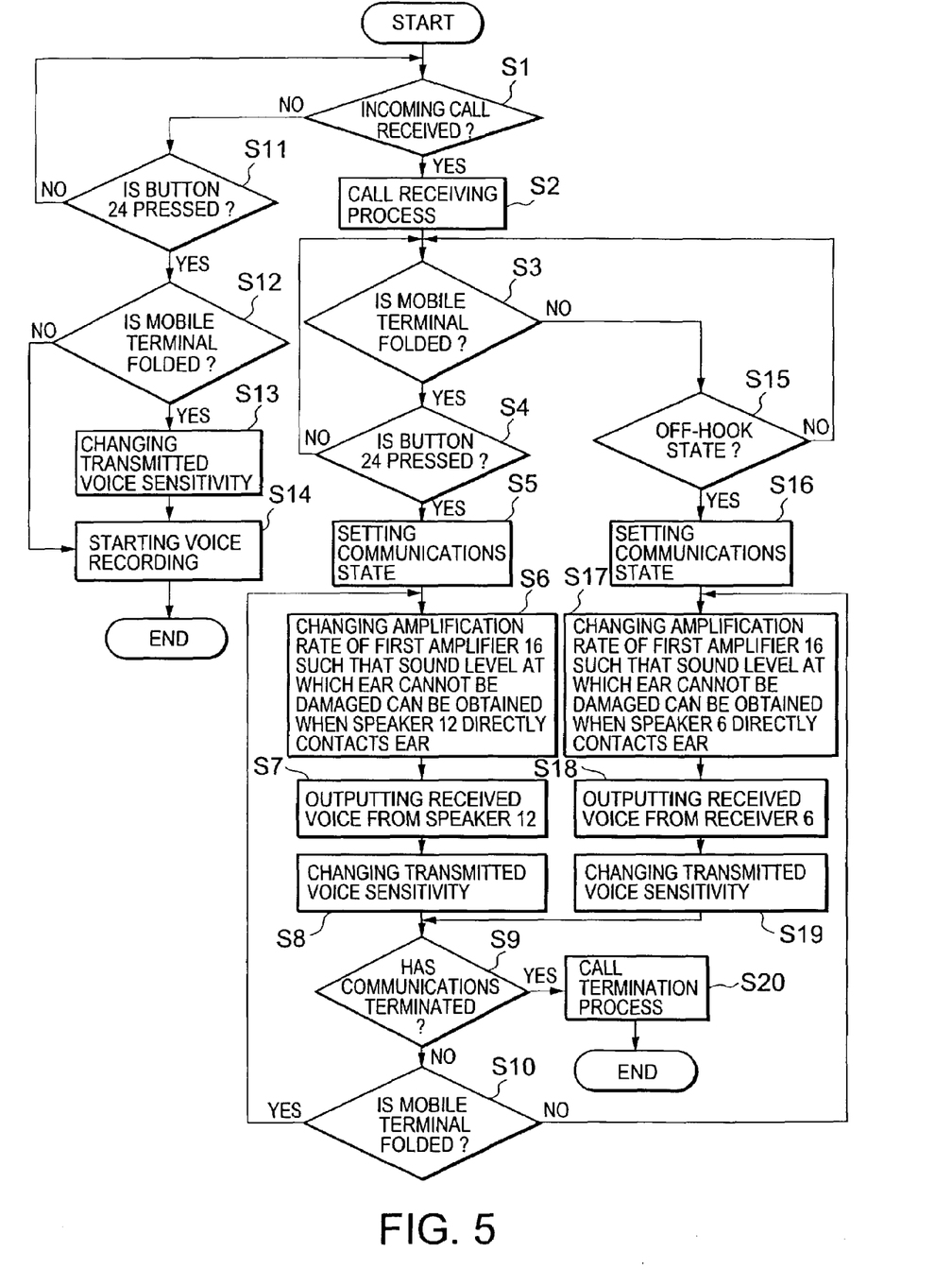
FIG. 5 is a flowchart of the operation of the mobile terminal device.

The operations are described below by referring to FIG. 5.

When power is turned on, the control unit 17 monitors whether or not an incoming call is received (S1).

If the button 24 is pressed to record the voice when an incoming call is not received (S11), the control unit 17 confirms using the open/close sensor 22 whether or not the mobile terminal device is folded (in the close state shown in FIG. 1A) (S12). If the mobile terminal device is in the close state, the transmitted voice sensitivity is raised so that the microphone 13 can collect sound although the microphone 13 is separate from the mouse of the user, and the voice recording process starts (S13 and S14). If the mobile terminal device is not in the close state (that is, in the open state), the transmitted voice sensitivity is not raised, and the voice recording process starts (S14).

When an incoming call is received, the control unit 17 processes the incoming call, and confirms using the open/close sensor 22 whether or not the mobile terminal device is in the close state (S2 and S3). When the mobile terminal device is folded, and the button 24 is pressed (S4), then the control unit 17 establishes a communications state (S5), changes the amplification rate of the first amplifier 16 such that the reception signal can be output at the sound level predetermined as the level to be output from the receiver 6 (S6). The control unit 17 changes the signal path so that the received voice can be output from the speaker 12 by operating the switch 18 (S7). Next, the control unit 17 changes the transmitted voice sensitivity by adjusting the amplification rate of the second amplifier 19 so that the microphone 13 can collect sound although it is separate from the mouth of the user (S8), thereby realizing the conversation with the mobile terminal device folded.

When the mobile terminal device is open in S3, the control unit 17 confirms whether or not the off-hook state has been entered (S15). If the off-hook state has been entered, the control unit 17 performs a conversation process (S16), and changes the amplification rate of the first amplifier 16 such that the reception signal can be output at an appropriate sound level from the receiver 6 (S17). The control unit 17 changes the signal path such that the received voice can be output from the receiver 6 by operating the switch 18 (S18). The control unit 17 also changes the transmitted voice sensitivity by adjusting the amplification rate of the second amplifier 19 such that the optimum transmitted voice sensitivity can be obtained in the communications with the mobile terminal device set in the open state (S19), thereby performing the process in S9.

Then, the control unit 17 confirms whether or not the communications have been completed (S9), and performs the call termination process if the communications have been completed (S20). If the communications have not been completed, then the control unit 17 confirms using the open/close sensor 22 whether or not the mobile terminal device is folded (S10). When the mobile terminal device is folded in S10, the process in S6 is performed, and if the mobile terminal device is not folded in S10, the process in S17 is performed.

If the button 24 is pressed with the mobile terminal device folded when an incoming call is received, the received voice is output only from the speaker 12, and the speaker's voice is collected by the microphone 13 through the microphone voice inlet 8 and then transmitted. If the mobile terminal device is opened when the communications are established, the received voice is output only from the receiver 6, and the speaker's voice is collected by the microphone voice inlet 3 and the microphone voice inlet 8, and is then transmitted.

Using the terminal of the above-mentioned embodiment, the button 24 is disposed on the side of the upper case 4. However, it can be disposed in any position as far as the user can easily press it.

Figure 6A:
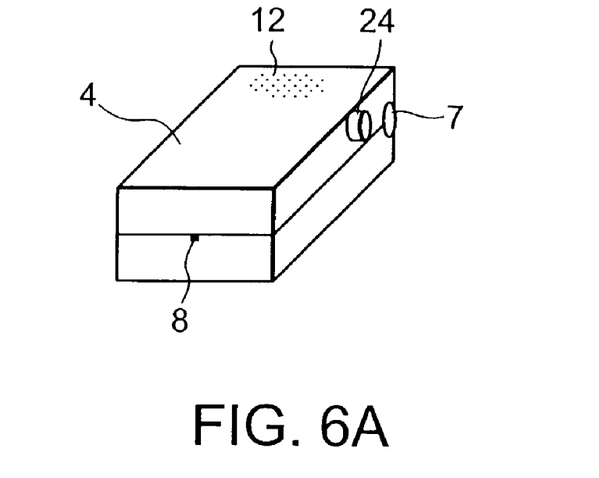
FIG. 6A is an oblique view of the mobile terminal device in a close state according to another embodiment of the present invention.
Figure 6B:
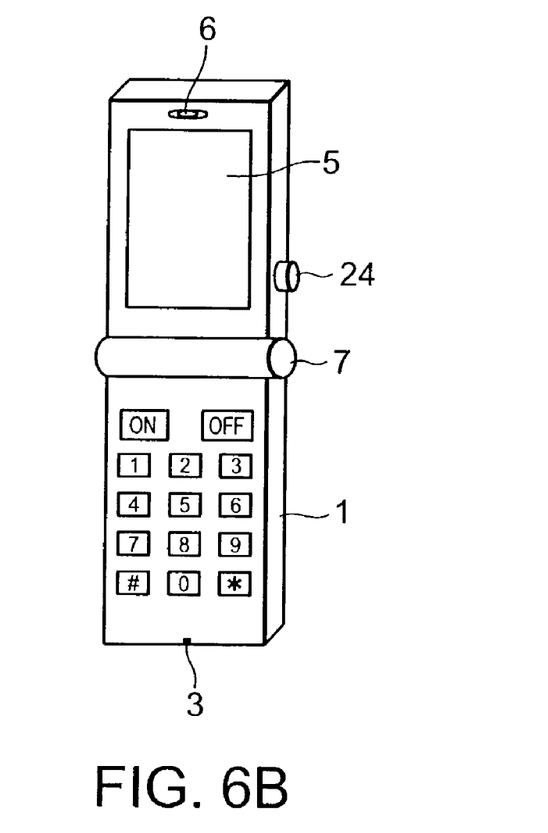
FIG. 6B is an oblique view of the mobile terminal device in an open state according to another embodiment of the present invention.

The microphone voice inlets 3 and 8 are explained as a separate and independent type, they can be connected to each other as shown in FIGS. 6A and 6B.

Figure 7A:
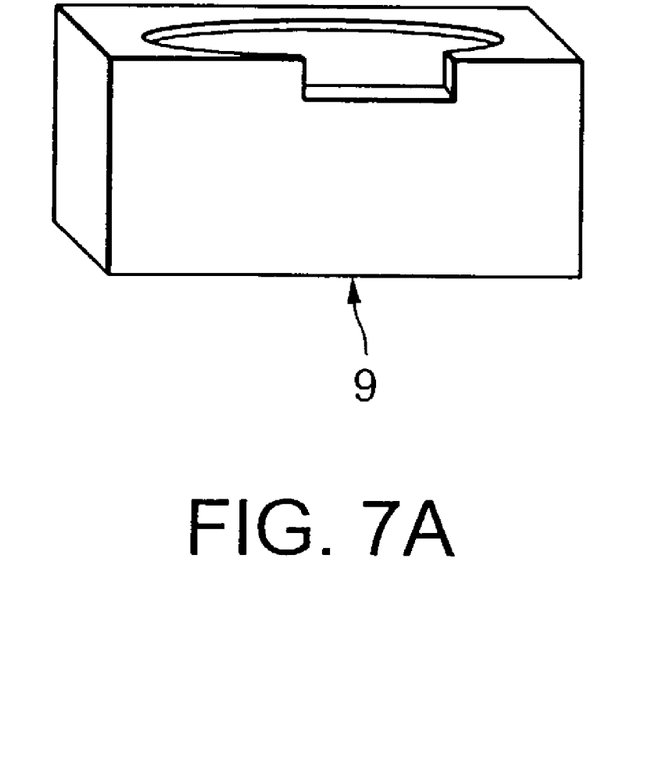
FIG. 7A is an oblique view of another embodiment of the microphone holder according to the present invention.
Figure 7B:
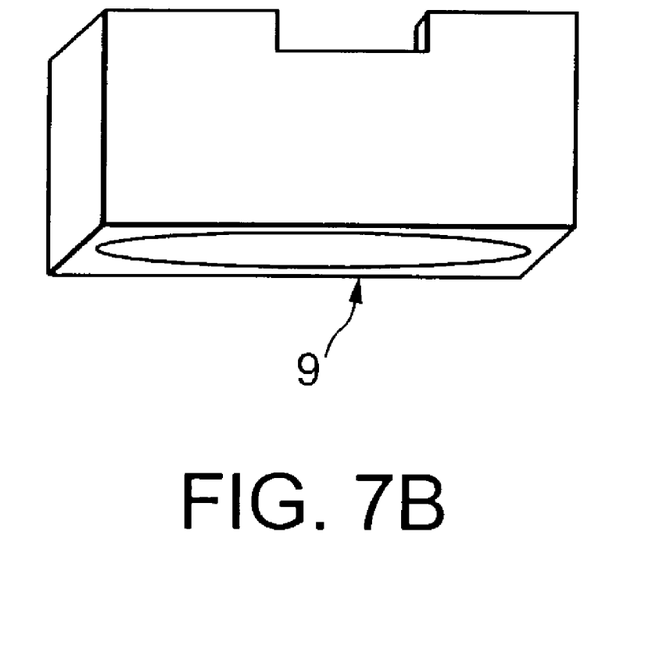
FIG. 7B is an oblique view of another embodiment of the microphone according to the present invention.

The microphone holder 9 can be a rectangular parallelepiped as shown in FIGS. 7A and 7B. With the configuration, the hole in the side of the microphone holder 9 closely contacts the microphone voice inlet, thereby successfully reducing a leak of voice.

Figure 8:
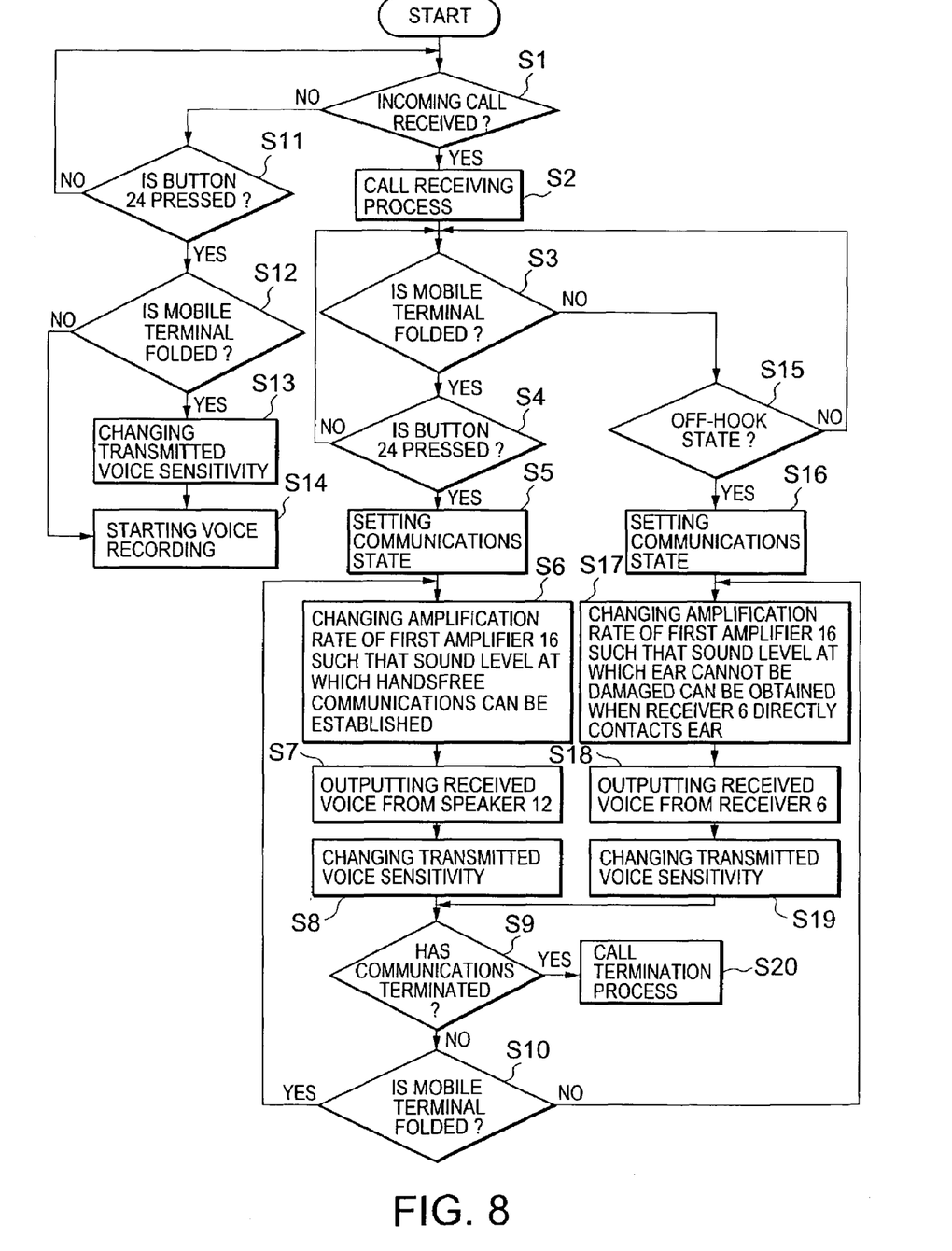
FIG. 8 is a flowchart of the operation according to another embodiment of the mobile terminal device.

As shown in FIG. 8, if the amplification rate of the first amplifier 16 is set in S6 at a sound level at which hands-free communications can be realized, then the hands-free communications can be performed with the mobile terminal device set in a folded state (close state). In FIG. 8, with respect to the other steps except S6, they are the same as those of FIG. 5.

Obviously, numerous additional modifications and variations of the present invention are possible in light of the above teachings. It is, therefore, to be understood that within the scope of the appended claims, the invention may be practiced otherwise than as specifically described herein.

What is claimed is:

1. A mobile terminal device, comprising:
   a first case unit; a second case unit;
   a hinge that connects said first case unit and said second case unit;
   a first mouthpiece disposed on an open/close surface of said first case unit;
   a second mouthpiece disposed on a surface of said first case unit other than said open/lose surface wherein the mobile terminal device further comprises a microphone that is used for both said first mouthpiece and second mouthpiece; and a microphone holder that holds said microphone
   a first earpiece disposed on an open/close surface of the second case unit; and
   a second earpiece disposed on a surface other than said open/close surface of the second case unit.

2. The mobile terminal device as claimed in claim 1, wherein said microphone holder has a hole so that transmitted voice sounds can be inputted into said second mouthpiece.

3. The mobile terminal device as claimed in claim 2, wherein said microphone holder is either cylindrical or rectangular parallelepiped.

4. The mobile terminal device as claimed in claim 3, wherein said first mouthpiece and said second mouthpiece are either circular or rectangular.

5. The mobile terminal device as claimed in claim 1, further comprising a detection means for detecting an open/close state of said first case unit and said second case unit.

6. The mobile terminal device as claimed in claim 5, wherein said second mouthpiece is disposed on at least one of a lower side, a right side and a left side of said first case unit.

7. The mobile terminal device as claimed in claim 6, wherein said second earpiece is disposed on at least one of a reverse side of said open/close surface, an upper side, a right side and a left side adjacent to said open/close surface of said second case unit.

8. The mobile terminal device as claimed in claim 7, further comprising an outputting means for outputting received voice sounds through said second earpiece when said first case unit and said second case unit are in a closed state, and outputting received voice sounds through said first earpiece when said first case unit and said second case unit are in an open state.

9. The mobile terminal device as claimed in claim 8, further comprising an inputting means for inputting transmitted voice sounds through said second mouthpiece when said first case unit and said second case unit are in a closed state, and inputting transmitted voice sounds through at least one of said first mouthpiece and second mouthpiece when said first case unit and said second case unit are in an open state.

10. The mobile terminal device as claimed in claim 9, further comprising a controlling means for controlling at least one of transmitted voice sensitivity and received voice sensitivity on the basis of a result of said the detection means.

11. The mobile terminal device as claimed in claim 10, wherein said mobile terminal device is a portable telephone.

12. An incoming call notifying method for a folding mobile terminal device, comprising:
    receiving an incoming call;
    detecting whether or not said mobile terminal device is folded;
    changing a received voice sensitivity of a first earpiece and a transmitted voice sensitivity of a first mouthpiece using a microphone if said mobile terminal device is folded; and
    changing a received voice sensitivity of a second earpiece and a transmitted voice sensitivity of a second mouthpiece using said microphone if said mobile terminal device is opened.

13. The incoming call notifying method for a folding mobile terminal device as claimed in claim 12, further comprising:
    judging whether or not a switch has been operated; and
    changing the transmitted voice sensitivity of said first mouthpiece using said microphone when said switch is operated and said mobile terminal device is folded; and
    recording the voice of a user via said first mouthpiece.

14. The incoming call notifying method for a folding mobile terminal device as claimed in claim 13, wherein said mobile terminal device is a portable telephone.

15. A mobile terminal device, comprising:
    a first case unit: a second case unit;
    a hinge that connects said first case unit and said second case unit;
    a first mouthpiece disposed on an open/close surface of said first case unit; a second mouthpiece disposed on a surface of said first case unit, said surface being adjacent to said open/close surface and not being on said open/close surface or the reverse surface of said open/close surface;
    a first earpiece disposed on an open/close surface of the second case unit; and
    a second earpiece disposed on an opposite surface of said open/close surface.

16. The mobile terminal device as claimed in claim 15, further comprising: a microphone that is used for both said first mouthpiece and second mouthpiece: and a microphone holder that holds said microphone.

17. The mobile terminal device as claimed in claim 15, further comprising a detection means for detecting an open/close state of said first case unit and said second case unit.

18. A mobile terminal device, comprising:
    a first case unit; a second case unit; a hinge that connects said first case unit and said second case unit;

a mouthpiece disposed on both an open/close surface of said first case unit and an adjacent surface to said open/close surface;

a first earpiece disposed on an open/close surface of the second case unit; and a second earpiece disposed on an opposite surface of said open/close surface.

19. The mobile terminal device as claimed in claim 18, further comprising: a microphone that is used for both said first mouthpiece and second mouthpiece; and a microphone holder that holds said microphone.

* * * * *